United States Patent
Chu et al.

(10) Patent No.: US 9,065,546 B2
(45) Date of Patent: Jun. 23, 2015

(54) PARALLEL HYBRID CIRCUIT

(71) Applicant: MEDIATEK INC., Hsin-Chu (TW)

(72) Inventors: Yu-Lin Chu, Hsinchu (TW);
Hsin-Hsien Li, Hsinchu (TW); Shih-Jen Li, Taichung (TW); Li-Yu Chiu, Hsinchu (TW); Bing-Hsun Lu, Yilan County (TW)

(73) Assignee: ECONET (Suzhou) Limited, Suzhou IndustrialPark, Suzhou, Jiangsu Province (CN)

( * ) Notice: Subject to any disclaimer, the term of this patent is extended or adjusted under 35 U.S.C. 154(b) by 83 days.

(21) Appl. No.: 13/922,238

(22) Filed: Jun. 19, 2013

(65) Prior Publication Data
US 2014/0192908 A1    Jul. 10, 2014

Related U.S. Application Data

(60) Provisional application No. 61/750,412, filed on Jan. 9, 2013.

(51) Int. Cl.
*H04B 1/58*    (2006.01)

(52) U.S. Cl.
CPC ...................................... *H04B 1/581* (2013.01)

(58) Field of Classification Search
CPC ....................................................... H04B 1/581
USPC .................................................. 375/257–258
See application file for complete search history.

(56) References Cited

U.S. PATENT DOCUMENTS 6,804,349 B1 * 10/2004 Prat et al. ...................... 379/402
2006/0222173 A1 * 10/2006 Lin et al. ................... 379/406.08

* cited by examiner

*Primary Examiner* — Kevin M Burd
(74) *Attorney, Agent, or Firm* — Winston Hsu; Scott Margo

(57) ABSTRACT

A parallel hybrid circuit comprising a transformer, a first matching resistor, a second matching resistor and an echo cancelling circuit. The transformer comprises: a first side, comprising a transmitting coil group and a receiving coil group, wherein the transmitting coil group comprises at least one transmitting coil, wherein the receiving coil group comprises at least one receiving coil; a second side comprising at least one transceiving coil; wherein the transformer receives a transmitting signal and couples the transmitting signal from the first side to the second side via a first turn ratio, and receives a receiving signal from the transceiving line and couples the receiving signal from the second side to the first side via a second turn ratio. The first, second matching resistors are coupled with the transformer in parallel. The echo cancelling circuit is coupled between the transmitting line and the receiving line.

20 Claims, 10 Drawing Sheets

PARALLEL HYBRID CIRCUIT

CROSS REFERENCE TO RELATED APPLICATIONS

This application claims the benefit of U.S. Provisional Application No. 61/750,412, filed on 2013 Jan. 9, the contents of which are incorporated herein by reference.

BACKGROUND

A hybrid circuit is always provided between a transmitter and a receiver, to respectively transform a transmitting signal and a receiving signal to desired voltage levels. FIG. 1 is a block diagram illustrating relations between a transmitter 101, a receiver 103 and a hybrid circuit 105 for the related art. As shown in FIG. 1, in an upstream operation, the hybrid circuit 105 receives a transmitting signal TS from the transmitter 101 via at least one transmitting lime $L_t$, and transforms the transmitting signal TS to a transformed transmitting signal TTS to at least one transceiving line $L_{tr}$. On the contrary, in a downstream operation, the hybrid circuit 105 receives a receiving signal RS via the transceiving line $L_{tr}$, and transforms the receiving signal RS to a transformed receiving signal TRS to the receiver 103 via at least one receiving line $L_r$.

FIG. 2 and FIG. 3 are circuit diagrams illustrating detail structures of a hybrid circuit for related art. FIG. 2 illustrates a parallel hybrid circuit for related art and FIG. 3 illustrates a serial hybrid circuit for related art. As shown in FIG. 2, the hybrid circuit 200 comprises a transformer 201 and two resistors $R_1$, $R_2$. The transformer 201 comprises a first side comprising a coil $C_{11}$ with a first coil number $cn_1$ and a coil $C_{12}$ with the first coil number $cn_1$, and a second side comprising a coil $C_{21}$ with a second coil number $cn_2$ and a coil $C_{22}$ with the second coil number $cn_2$.

For an upstream operation, a first terminal $T_1$ of the coil $C_{11}$ and a second terminal $T_2$ of the coil $C_{12}$ receive a transmitting signal TS. The transmitting signal TS is transformed from the first side to the second side via a first turn ratio equaling to $cn_1$:$cn_2$, to generate the transformed transmitting signal TTS.

For a downstream operation, a first terminal $T_1$ of the coil $C_{21}$ and a second terminal $T_1$ of the coil $C_{22}$ receive a receiving signal RS. The receiving signal RS is coupled from the second side to the first side via a second turn ratio equaling to $cn_2$:$cn_1$.

However, in such structure, the first turn ratio is $cn_1$:$cn_2$ and the second turn ratio is $cn_2$:$cn_1$, thus the second turn ratio is fixed a reciprocal of the first turn ratio. It is not convenient since the signal may be desired to be transformed to other voltage levels.

As above-mentioned, FIG. 3 is a circuit diagram illustrating a serial hybrid circuit for related art. In such related art, a first side of the transformer 301 comprises a coil $C_1$ with a first coil number $cn_1$ and a coil $C_3$ with a third coil number $cn_3$. Also, a second side of the transformer 301 comprises a coil $C_2$ with a second coil number $cn_2$.

For an upstream operation, the hybrid circuit 300 couples the transmitting signal TS from the first side to the second side to generate the transformed transmitting signal TTS via a first turn ratio. Additionally, for the downstream operation, the hybrid circuit 300 couples to the receiving signal RS from the second side to the first side to generate the transformed receiving signal TRS via a second turn ratio. In this structure, the first ratio equals to $cn_1$:$cn_2$, and the second ratio equals to $cn_2$:$cn_3$, therefore, the second turn ratio is not limited to a reciprocal of the first turn ratio. However, the structure of the hybrid circuit 300 comprises resistors $R_1$ and $R_2$ coupled with the transformer in series, thus a coil number for the upstream path must be high. Leakage inductance may exist for such structure, which causes recession for high frequency signals. Also, such structure may have a high echo $cn_1$:$cn_3$, which occurs between an upstream path and a down stream path.

SUMMARY

One objective of the present application is to provide a parallel hybrid circuit that the downstream turn ratio thereof is not limited to a reciprocal of the turn ratio for upstream.

One objective of the present application is to provide a parallel hybrid circuit that can decrease the necessary power of the signal.

One objective of the present application is to provide a parallel hybrid circuit that can degrade echo.

One embodiment of the present application discloses a parallel hybrid circuit comprising a transformer, a first matching resistor, a second matching resistor and an echo cancelling circuit. The transformer comprises: a first side, comprising a transmitting coil group and a receiving coil group, wherein the transmitting coil group comprises at least one transmitting coil, wherein the receiving coil group comprises at least one receiving coil; a second side comprising at least one transceiving coil; wherein the transformer receives a transmitting signal from at least one transmitting line and couples the transmitting signal from the first side to the second side via a first turn ratio, and receives a receiving signal from the transceiving line and couples the receiving signal from the second side to the first side via a second turn ratio. The first, second matching resistors are coupled with the transformer in parallel. The echo cancelling circuit is coupled between the transmitting line and the receiving line.

In view of above-mentioned embodiments, a turn ratio for the downstream operation of the parallel hybrid circuit according to the present application is not limited to a reciprocal of a turn ratio for the upstream operation. Also, the matching resistors for the parallel hybrid circuit is coupled with the transformer in parallel, thus the signal does not need large power. Besides, the echo can be degraded due to the arrangement of coils.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
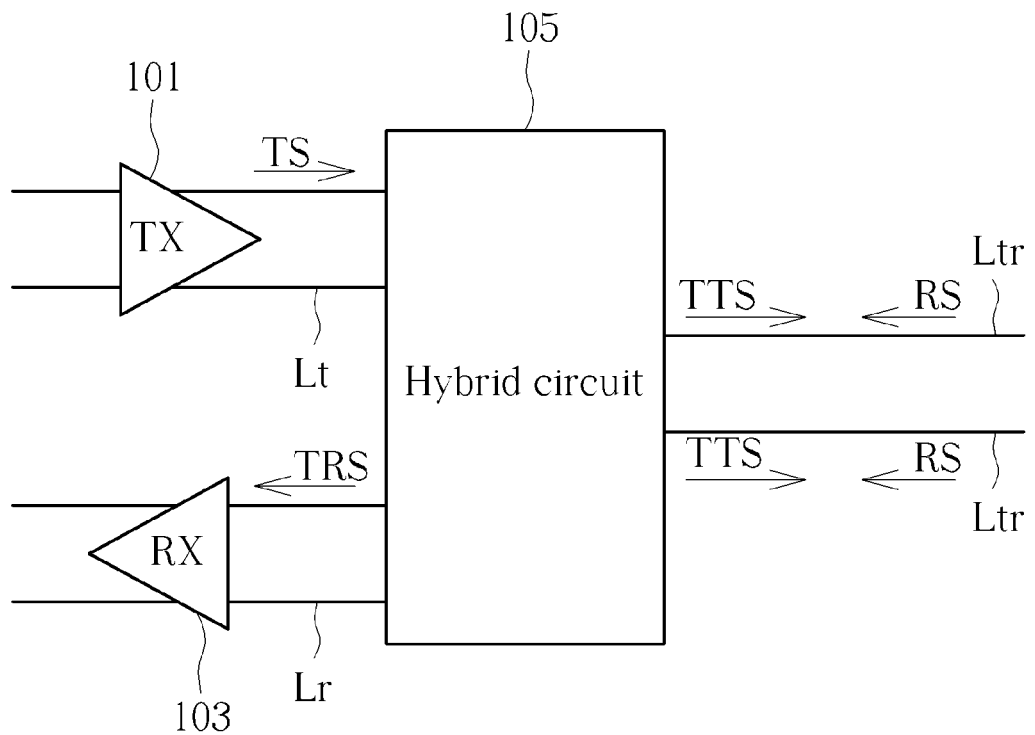
FIG. 1 is a block diagram illustrating relations between a transmitter, a receiver and a hybrid circuit for the related art.
Figure 2:
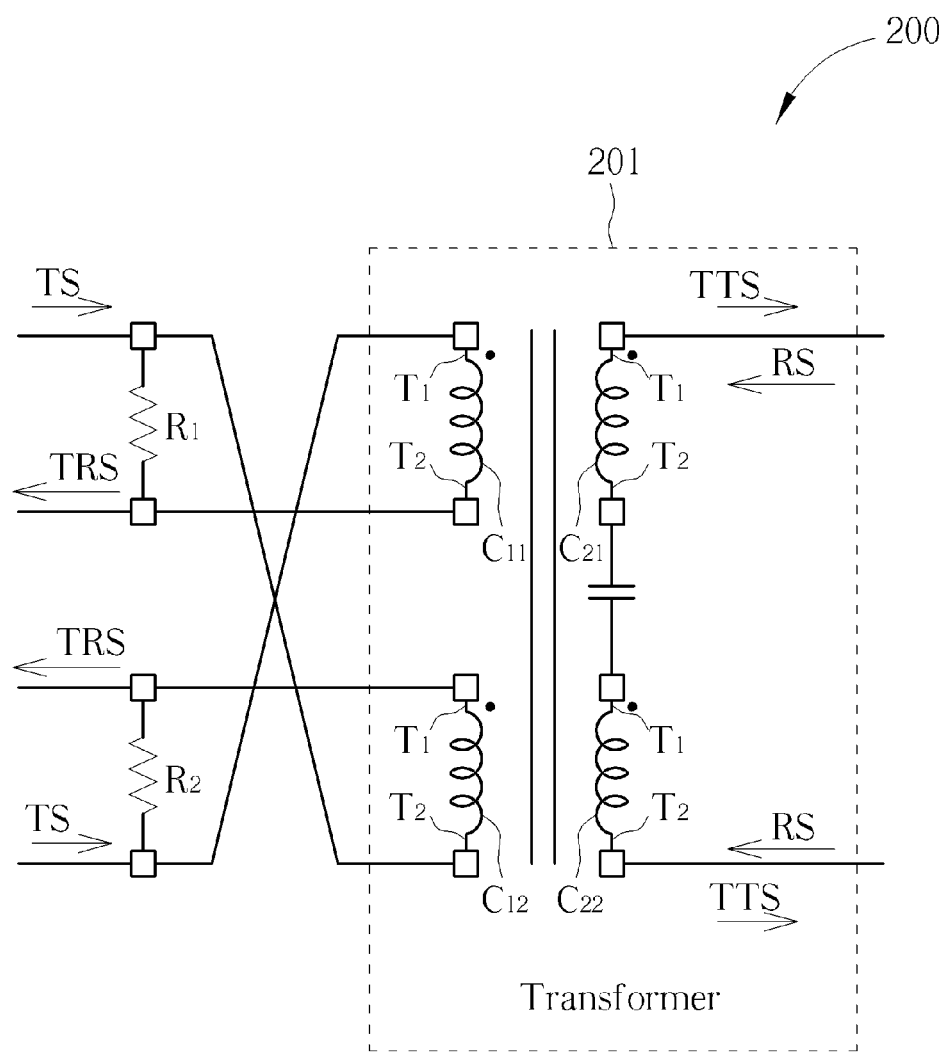
FIG. 2 and FIG. 3 are circuit diagrams illustrating detail structures of a hybrid circuit for related art.
Figure 3:
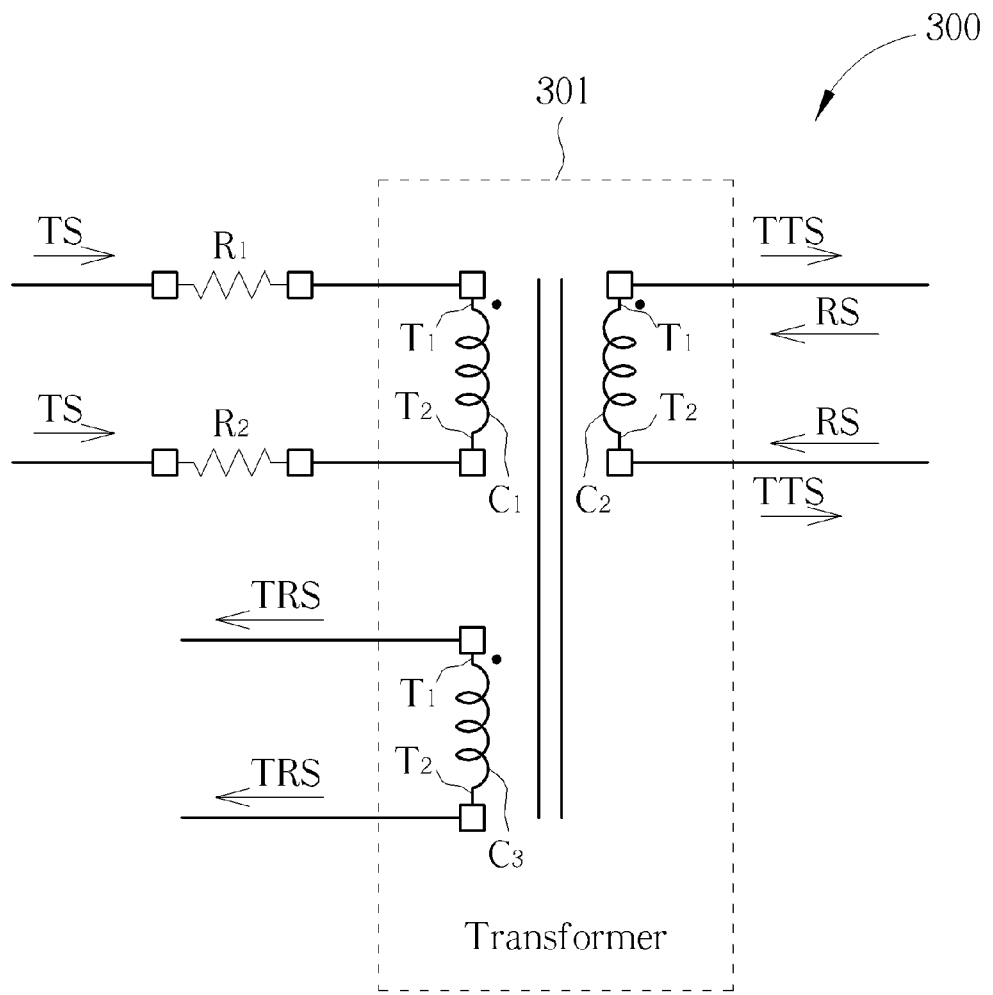
Figure 4:
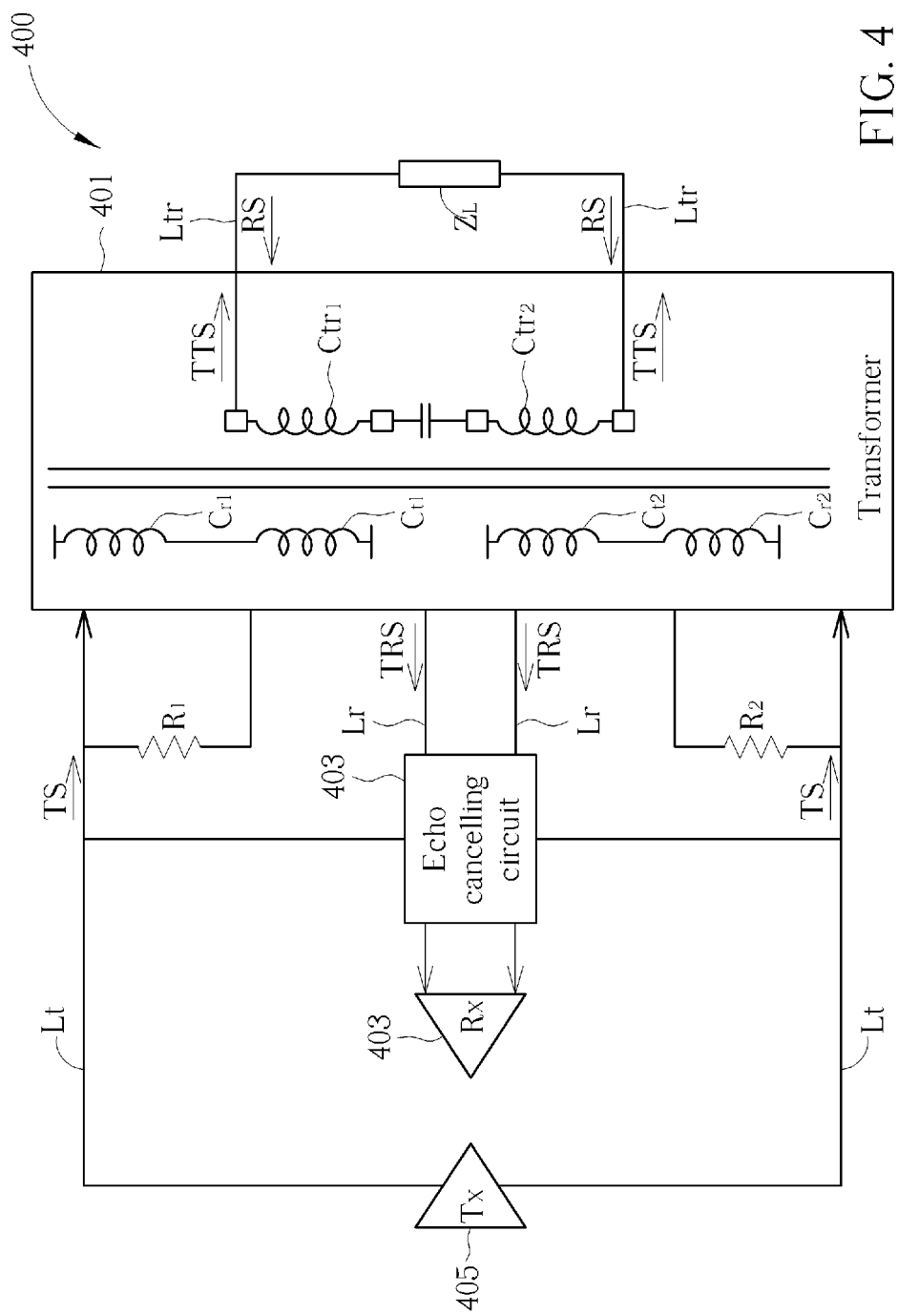
FIG. 4 is a block diagram illustrating a parallel hybrid circuit according to an embodiment of the present application.

FIG. 4 is a block diagram illustrating a parallel hybrid circuit 400 according to an embodiment of the present application. As shown in FIG. 4, the parallel hybrid circuit 400 comprises: a transformer 401, a first matching resistor $R_1$, a second matching resistor $R_2$ and an echo cancelling circuit 403. The transformer 401 comprises a first side and a second side. The first side comprises a transmitting coil group and a receiving coil group. The transmitting coil group comprises at least one transmitting coil respectively having a transmitting coil number $cn_t$, such as the transmitting coils $C_{t1}$ and $C_{t2}$ in FIG. 4. The receiving coil group comprises at least one receiving coil respectively having a receiving coil number $cn_r$, such as the transmitting coils $C_{r1}$ and $C_{r2}$ in FIG. 4. The second side comprises at least one transceiving coil having a transceiving coil number $cn_{tr}$, such as the transceiving coils $C_{tr1}$ and $C_{tr1}$ in FIG. 4.

The transformer 401 receives a transmitting signal TS from at least one transmitting line $L_t$, and couples the transmitting signal TS from the first side to the second side via a first turn ratio to generate a transformed transmitting signal TTS to at least one transceiving line $L_{tr}$, and receives a receiving signal RS from the transceiving line $L_{tr}$ and couples the receiving signal RS from the second side to the first side via a second turn ratio to generate a transformed receiving signal TRS to at least one receiving line $L_r$. The first turn ratio is relative to the $cn_t$ and the $cn_{tr}$, and the second turn ratio is relative to the $cn_{tr}$ and the $cn_r$. In one embodiment, the transmitting lines $L_t$ are coupled to a transmitter 405 and the receiving lines $L_r$ are coupled to a receiver 403. Please note this does not mean to limit the scope of the present application. The transmitting lines $L_t$ and the receiving lines $L_r$ can be coupled to any other devices if the circuit shown in FIG. 4 is applied for other applications.

The first matching resistor $R_1$ and the second matching resistor $R_2$ are coupled with the transformer in parallel, which will be described for more detail later. In one embodiment, the resistance values of the first matching resistor $R_1$ and the second matching resistor $R_2$ are designed to match impedance of the circuit that the transceiving lines $L_{tr}$ are coupled (i.e. $Z_L$), but is not limited.

The echo cancelling circuit 403, which is coupled between the transmitting line and the receiving line, is arranged to subtract off the transmitting signal TS from the transformed receiving signal TRS by summing a 180 degree phase shifted version of the transmitting signal TS with the transformed receiving signal TRS. The arrangement for the transmitting coils, the receiving coils and the transceiving coils are different in the following embodiments, therefore the structure of the echo cancelling circuit 403 varies correspondingly in order to reach the above-mentioned function.

Figure 5:
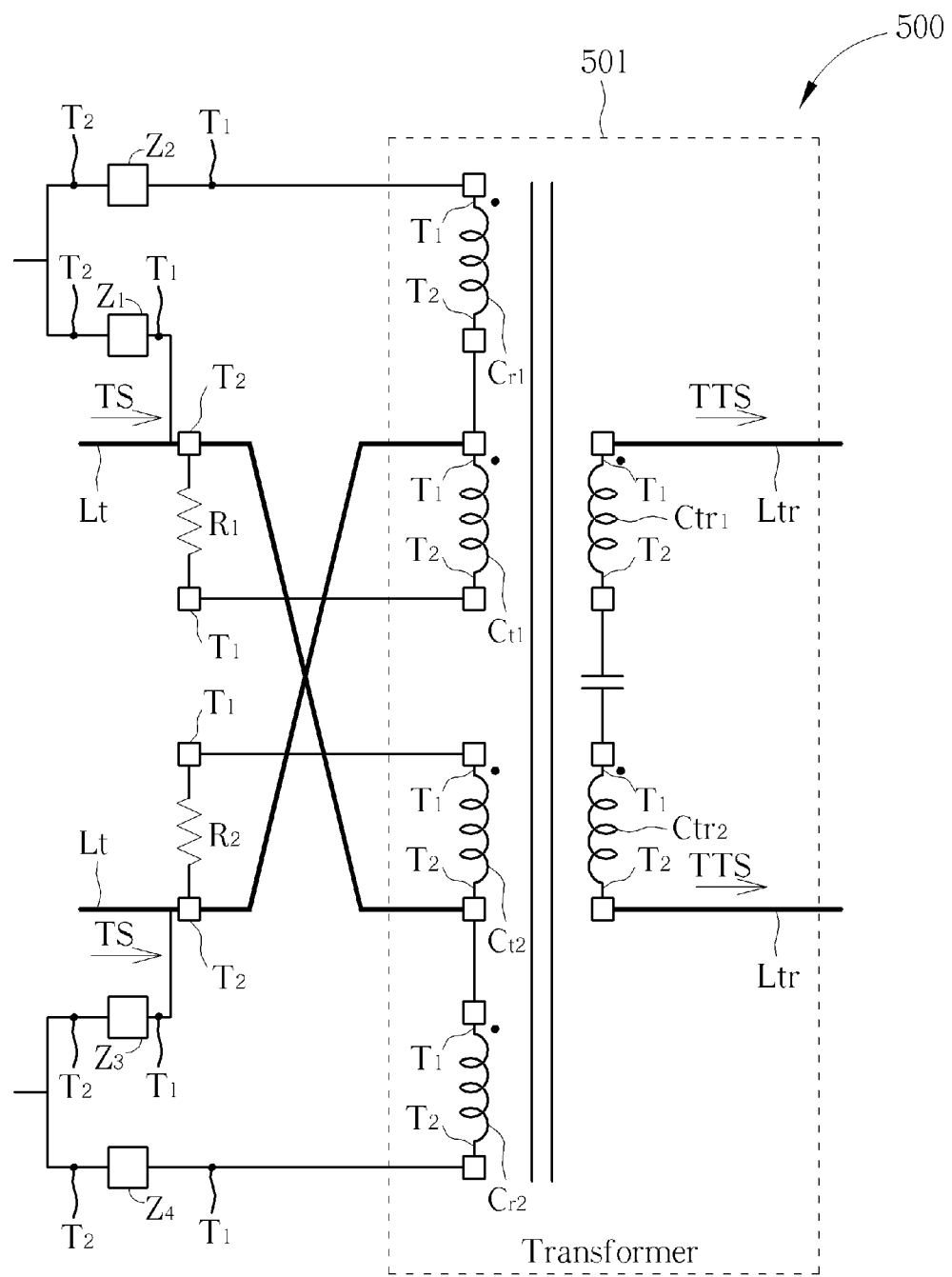
FIG. 5-FIG. 10 are circuit diagrams illustrating detail structures of the parallel hybrid circuits according to different embodiments of the present application.
Figure 6:
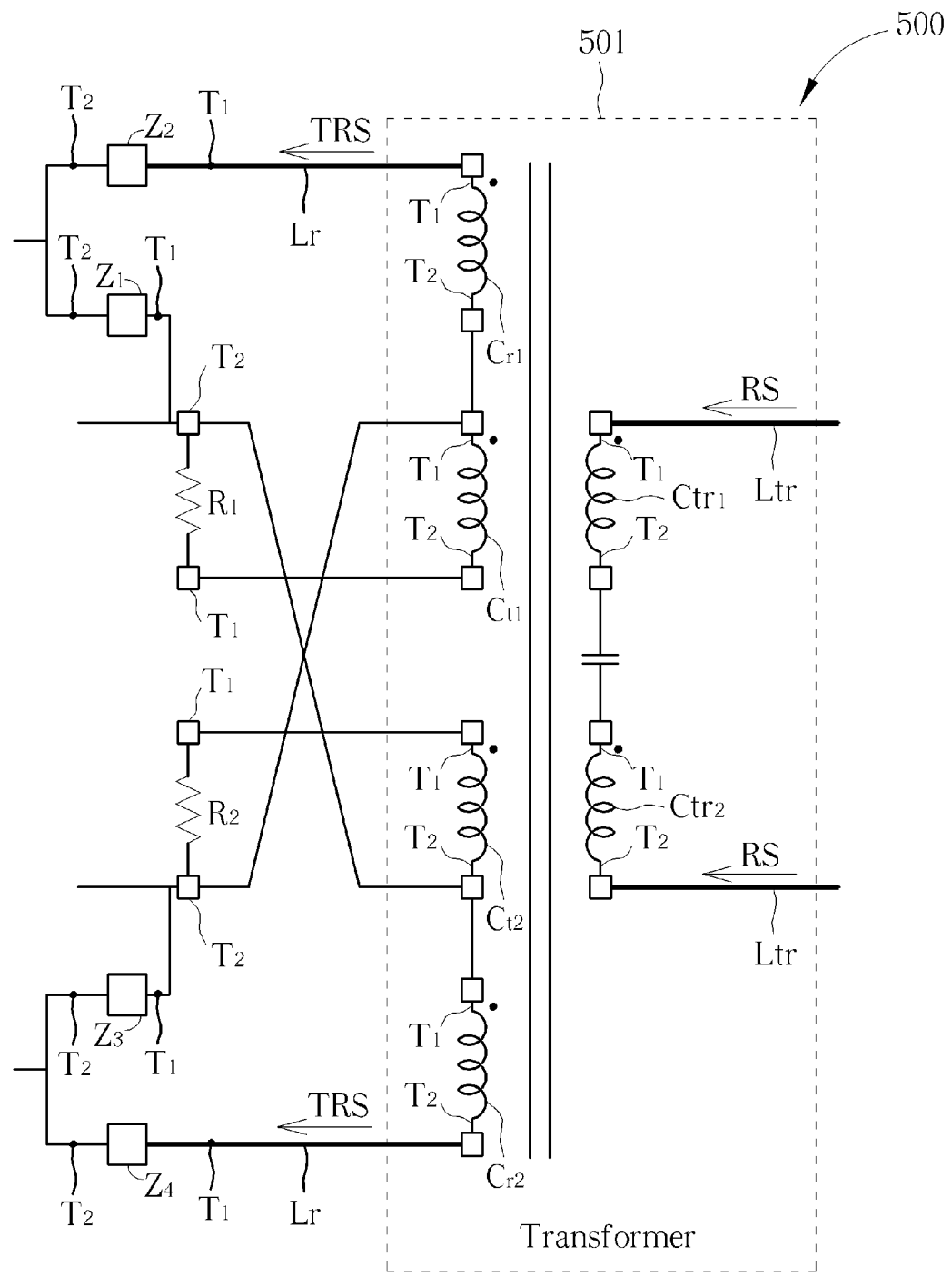

FIG. 5 and FIG. 6 are circuit diagrams illustrating a parallel hybrid circuit 500 according to an embodiment of the present application. The parallel hybrid circuit 500 in FIG. 5 and FIG. 6 comprises the same structures but has different operations. In FIG. 5 the parallel hybrid circuit 500 performs an upstream operation. In FIG. 6 the parallel hybrid circuit 500 performs a downstream operation. Please note for the convenience for understanding the concept, only symbols relative with the operation are shown in FIG. 5 and FIG. 6.

Please refer to FIG. 5, in FIG. 5 the transmitting coil group in the first side of the transformer 501 comprises a first transmitting coil $C_{t1}$ and a second transmitting coil $C_{t2}$. The receiving coil group in the first side of the transformer 501 comprises a first receiving coil $C_{r1}$ and a second receiving coil $C_{r2}$. The first transmitting coil $C_{t1}$, the second transmitting coil $C_{t2}$, the first receiving coil $C_{r1}$, and the second receiving coil $C_{r2}$ respectively have a first terminal $T_1$ having a first polarity and a second terminal $T_2$ having a second polarity. In FIG. 5 the first terminal $T_1$ of the first transmitting coil $C_{t1}$ is coupled to the second terminal $T_2$ of the first receiving coil $C_{r1}$, and the second terminal $T_2$ of the second transmitting coil $C_{t2}$ is coupled to the first terminal $T_1$ of the second receiving coil $C_{r2}$. A first terminal $T_1$ of the first matching resistor $R_1$ is coupled to the second terminal $T_2$ of the first transmitting coil $C_{t1}$, and a second terminal $T_2$ of the first matching resistor $R_1$ is coupled to the second terminal $T_2$ of the second transmitting coil $C_{t2}$. A first terminal $T_1$ of the second matching resistor $R_2$ is coupled to the first terminal $T_1$ of the second transmitting coil $C_{t2}$, and a second terminal $T_2$ of the second matching resistor $R_2$ is coupled to the first terminal $T_1$ of the first transmitting coil $C_{t1}$.

Additionally, in this embodiment the echo cancelling circuit 403 in FIG. 4 comprises a first resistance device $Z_1$, a second resistance device $Z_2$, a third resistance device $Z_3$ and a fourth resistance device $Z_4$. The first resistance device $Z_1$ has a first terminal $T_1$ coupled to the second terminal $T_2$ of the first matching resistor $R_1$. The second resistance device $Z_2$ has a first terminal $T_1$ coupled to the first terminal $T_1$ of the first receiving coil $C_{r1}$, and has a second terminal $T_2$ coupled to a second terminal $T_2$ of the first resistance device $Z_1$. The third resistance device $Z_3$ has a first terminal $T_1$ coupled to the second terminal $T_2$ of the second matching resistor $R_2$. The fourth resistance device $Z_4$ has a first terminal $T_1$ coupled to the second terminal $T_2$ of the second receiving coil $C_{r2}$, and has a second terminal $T_2$ coupled to a second terminal $T_2$ of the third resistance device $Z_3$.

Please refer to FIG. 5, which illustrates the paths for an up stream operation. Please note the pates are marked by bold lines. For an upstream operation, the first terminal $T_1$ of the first transmitting coil $C_{t1}$ and the second terminal $T_2$ of the first transmitting coil $C_{t2}$ receive the transmitting signal TS via the transmitting lines $L_t$ and couples the transmitting signal TS from the first, second transmitting coils $C_{t1}$, $C_{t2}$ to the first, second transceiving coils $C_{tr1}$, $C_{tr2}$. Therefore a transformed transmitting signal TTS is generated via a first turn ratio. In such upstream operation, the first turn ratio is $cn_t:cn_{tr}$. In one embodiment, $cn_t:cn_{tr}$ is 1:N, wherein N is a positive integer, but not limited. Besides, please note the paths along the second resistance device $Z_2$ and the fourth resistance device $Z_4$ of the echo cancelling circuit also have some signals generated from the transmitting signal TTS since the first receiving coil $C_{r1}$ and the second receiving coil $C_{r2}$ are coupled to the first transmitting coil $C_{t1}$ and the second transmitting coil $C_{t2}$.

Please refer to FIG. 6, which discloses a downstream operation For a downstream operation, the first terminal $T_1$ of the first transceiving coil $C_{tr1}$ and the second terminal $T_2$ of the second transceiving coil $C_{tr1}$ receive the receiving signal RS and couples the receiving signal RS to the first, second receiving coils $C_{r1}$, $C_{r2}$ to generate the transformed receiving signal TRS. In such downstream operation, the second turn ratio is $cn_{tr}:cn_r$. In one embodiment, $cn_{tr}:cn_r$ are N:M, which are both positive integers. Please note in the downstream operation, the paths along the second resistance device $Z_2$ and the fourth resistance device $Z_4$ may have the transformed receiving signals TRS and of the signals generated from the transmitting signals caused by the upstream operation. Therefore, the echo cancelling circuit comprising resistance devices $Z_1$, $Z_2$, $Z_3$, and $Z_4$ subtracts off the signal generated from the transmitting signal TS from the transformed receiving signal TRS by summing a 180 degree phase shifted version of the signal generated from the transmitting signal TS with the transformed receiving signal TRS.

Figure 7:
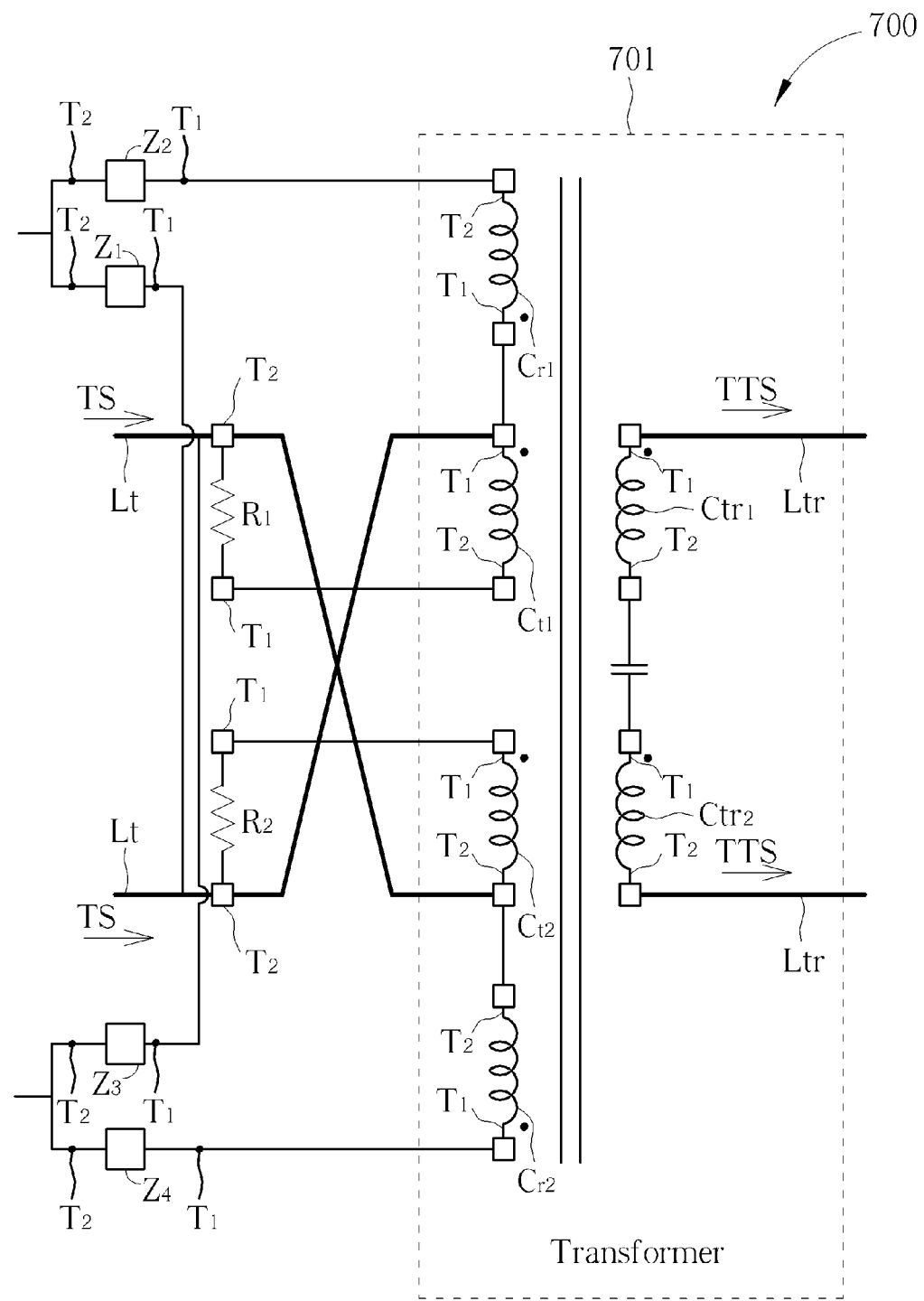
Figure 8:
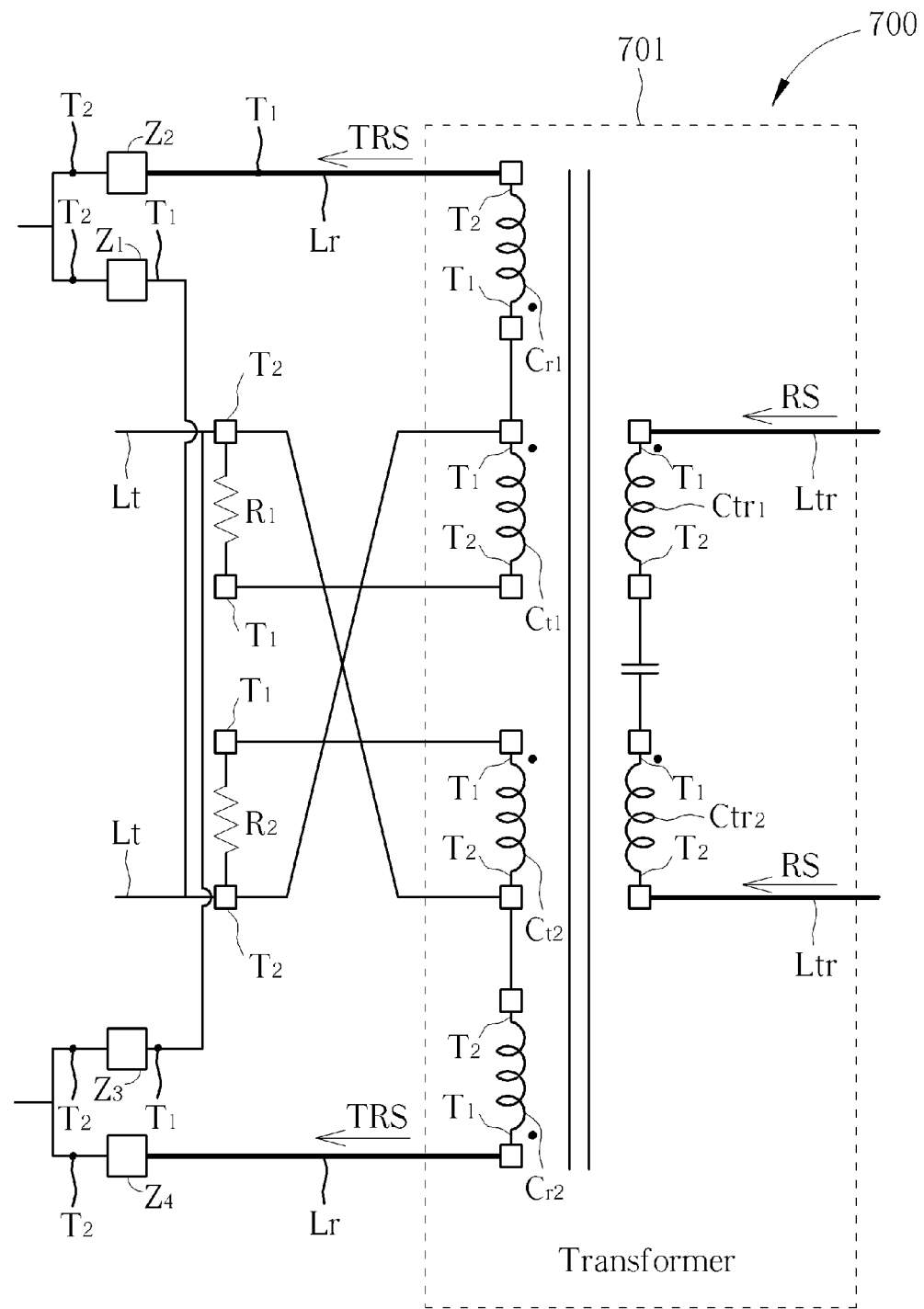

FIG. 7 and FIG. 8 are circuit diagrams illustrating a parallel hybrid circuit 700 according to another embodiment of the present application. The parallel hybrid circuit 700 in FIG. 7 and FIG. 8 comprises the same structures but has different operations. In FIG. 7 the parallel hybrid circuit 700 performs an upstream operation. In FIG. 8 the parallel hybrid circuit 700 performs a downstream operation.

The parallel hybrid circuit 700 in FIG. 7 and FIG. 8 has a similar structure with which of the parallel hybrid circuit 500 in FIG. 5 and FIG. 6. The difference between the parallel hybrid circuit 500 and the parallel hybrid circuit 700 is that the polarity of the first receiving coil $C_{r1}$ and the second receiving coil $C_{r2}$ are opposite. For more detail, in the parallel hybrid circuit 500 the first terminal $T_1$ of the first transmitting coil $C_{t1}$ is electrically connected to the second terminal $T_2$ of the first receiving coil $C_{r1}$, and the second terminal $T_2$ of the second transmitting coil $C_{t2}$ is electrically connected to the first terminal $T_1$ of the second receiving coil $C_{r2}$. However, in the parallel hybrid circuit 700 the first terminal $T_1$ of the first transmitting coil $C_{t1}$ is electrically connected to the first terminal $T_1$ of the first receiving coil $C_{r1}$, and the second terminal $T_2$ of the second transmitting coil $C_{t2}$ is electrically connected to the second terminal $T_2$ of the second receiving coil $C_{r2}$.

The echo cancelling circuit in the parallel hybrid circuit 700 also comprises a first resistance device $Z_1$, a second resistance device $Z_2$, a third resistance device $Z_3$ and a fourth resistance device $Z_4$, the same as the echo cancelling circuit in the parallel hybrid circuit 500. However, the structure of the echo cancelling circuit in the parallel hybrid circuit 700 is different from which of the echo cancelling circuit in the parallel hybrid circuit 500, since the transformer's structures are different. In the parallel hybrid circuit 700, the first terminal $T_1$ of the first resistance device $Z_1$ is coupled to the second terminal $T_2$ of the second matching resistor $R_2$ rather than the second terminal $T_2$ of the first matching resistor $R_1$. Additionally, the first terminal $T_1$ of the third resistance device $Z_3$ is coupled to the second terminal $T_2$ of the first matching resistor $R_1$ rather than the second terminal $T_2$ of the second matching resistor $R_2$.

The upstream operation and the downstream operation of the parallel hybrid circuit 700, respectively shown in FIG. 7 and FIG. 8 are the same as which of the parallel hybrid circuit 500, thus the description thereof are omitted for brevity here. Besides the difference for the structure, the echo turn ratio between the upstream path and the down stream path are also different for the parallel hybrid circuit 700 and the parallel hybrid circuit 500. For the parallel hybrid circuit 500 the echo turn ratio is $cn_t:cn_r$, but for the parallel hybrid circuit 700 the echo turn ratio is $cn_t:cn_r-1$. Additionally, the operation for the echo cancelling circuit in the parallel hybrid circuit 700 is the same as which of the parallel hybrid circuit 500, thus it is omitted for brevity here. The first, second turn ratio for the parallel hybrid circuit 700 is the same as which of the parallel hybrid circuit 500.

Figure 9:
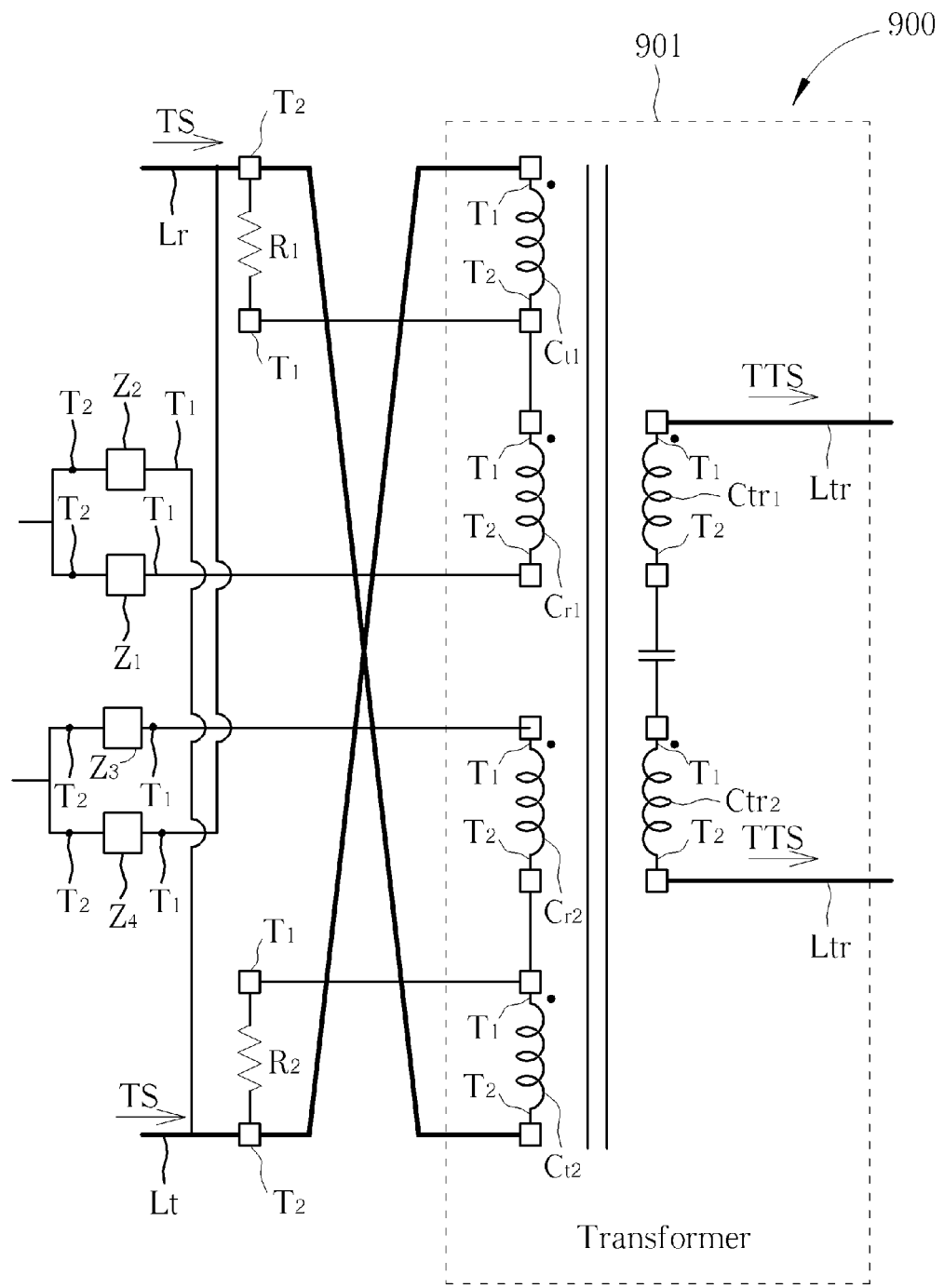
Figure 10:
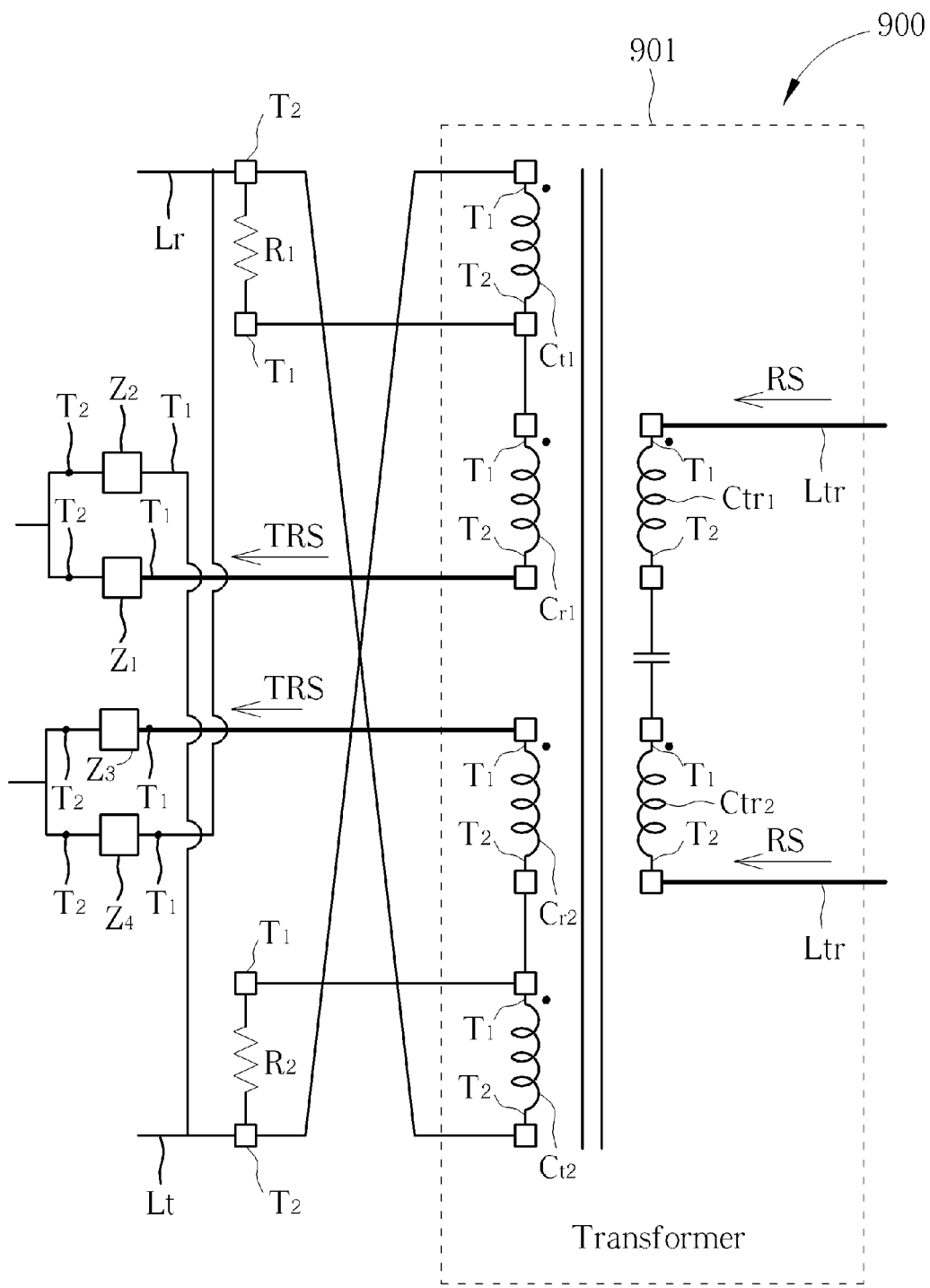

FIG. 9 and FIG. 10 are circuit diagrams illustrating a parallel hybrid circuit 900 according to another embodiment of the present application. The parallel hybrid circuit 900 in FIG. 9 and FIG. 10 comprises the same structures but has different operations. In FIG. 9 the parallel hybrid circuit 900 performs an upstream operation. In FIG. 10 the parallel hybrid circuit 900 performs a downstream operation.

In the parallel hybrid circuit 900, the first terminal $T_1$ of the first receiving coil $C_{r1}$ is coupled to the second terminal $T_2$ of the first transmitting coil $C_{t1}$, and the second terminal $T_2$ of the second receiving coil $C_{r2}$ is coupled to the first terminal $T_1$ of the second transmitting coil $C_{t2}$. Also, a first terminal $T_1$ of the first matching resistor $R_1$ is coupled to the second terminal $T_2$ of the first transmitting coil $C_{t1}$, and a second terminal $T_2$ of the first matching resistor $R_1$ is coupled to the second terminal $T_2$ of the second transmitting coil $C_{t2}$. A first terminal $T_1$ of the second matching resistor $R_2$ is coupled to the first terminal $T_1$ of the second transmitting coil $C_{t2}$, and a second terminal $T_2$ of the second matching resistor $R_2$ is coupled to the first terminal $T_1$ of the first transmitting coil $C_{t1}$.

The echo cancelling circuit in the parallel hybrid circuit 900 also comprises a first resistance device $Z_1$, a second resistance device $Z_2$, a third resistance device $Z_3$ and a fourth resistance device $Z_4$, the same as the echo cancelling circuit in the parallel hybrid circuit 500. However, the structure of the echo cancelling circuit in the parallel hybrid circuit 900 is different from which of the echo cancelling circuit in the parallel hybrid circuit 500, since the arrangement for the matching resistors and the transformer are different.

The arrangement for the echo cancelling circuit in the parallel hybrid circuit 900 is as follows: the first resistance device $Z_1$ has a first terminal $T_1$ coupled to the second terminal $T_2$ of the first receiving coil $C_{r1}$. The second resistance device $Z_2$ has a first terminal $T_1$ coupled to the second terminal $T_2$ of the second matching resistor $R_2$, and has a second terminal $T_2$ coupled to a second terminal $T_2$ of the first resistance device $Z_1$. The third resistance device $Z_3$ has a first terminal $T_1$ coupled to the first terminal $T_1$ of the second receiving $C_{r2}$. The fourth resistance device $Z_4$ has a first terminal $T_1$ coupled to the second terminal $T_2$ of the first matching resistor $R_1$, and has a second terminal $T_2$ coupled to a second terminal $T_2$ of the third resistance device $Z_3$.

Please refer to FIG. 9, for the upstream operation, the second terminal $T_2$ of the second transmitting coil $C_{t2}$ and the first terminal $T_1$ of the first transmitting coil $C_{t1}$ receive the transmitting signal TS and couples the transmitting signal TS from the first, second transmitting coils $C_{t1}$, $C_{t2}$ to the first, second transceiving coils $C_{tr1}$, $C_{tr2}$ to generate a transformed transmitting signal TTS via a first turn ratio. The first turn ratio for the upstream operation of the parallel hybrid circuit 900 is $cn_t:cn_{tr}$.

For a downstream operation, as shown in FIG. 10, the first terminal $T_1$ of the first transceiving coil $C_{tr1}$ and the second terminal $T_2$ of the second transceiving coil $C_{tr2}$ receive the receiving signal RS and couples the receiving signal RS from the first, second transceiving coils $C_{tr1}$, $C_{tr2}$ to the first, second transmitting coils $C_{t1}$, $C_{t2}$ and the first, second receiving coils $C_{r1}$, $C_{r2}$ to generate a transformed receiving signal TRS via a second turn ratio. The second turn ratio for the downstream operation of the parallel hybrid circuit 900 is $cn_{tr}:cn_t+cn_r$. Also, the echo turn ratio of the parallel hybrid circuit 900 is $cn_t:cn_r$. Additionally, the operation for the echo cancelling circuit in the parallel hybrid circuit 900 is similar with which of the parallel hybrid circuit 500, thus it is omitted for brevity here.

In view of above-mentioned embodiments, a turn ratio for the downstream operation of the parallel hybrid circuit according to the present application is not limited to a reciprocal of a turn ratio for the upstream operation. Also, the matching resistors for the parallel hybrid circuit is coupled with the transformer in parallel, thus the signal does not need large power. Besides, the echo can be degraded due to the arrangement of coils.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A parallel hybrid circuit, comprising:
 a transformer, comprising:
  a first side, comprising a transmitting coil group and a receiving coil group, wherein the transmitting coil group comprises at least one transmitting coil respec- tively having a transmitting coil number $cn_t$, wherein the receiving coil group comprises at least one receiving coil respectively having a receiving coil number $cn_r$, a second side comprising at least one transceiving coil having a transceiving coil number $cn_{tr}$;

wherein the transformer receives a transmitting signal from at least one transmitting line and couples the transmitting signal from the first side to the second side via a first turn ratio to generate a transformed transmitting signal to at least one transceiving line, and receives a receiving signal from the transceiving line and couples the receiving signal from the second side to the first side via a second turn ratio to generate a transformed receiving signal to at least one receiving line;

where the first turn ratio is relative to the $cn_t$ and the $cn_{tr}$, and the second turn ratio is relative to the $cn_{tr}$ and the $cn_r$;

wherein the transmitting coil group and the receiving coil group are different coil groups, wherein the transmitting coil group does not output the transformed receiving signal, wherein the receiving coil group does not receive the transmitting signal;

a first matching resistor, coupled with the transformer in parallel;

a second matching resistor, coupled with the transformer in parallel; and an echo cancelling circuit coupled between the transmitting line and the receiving line.

2. The parallel hybrid circuit of claim 1, wherein the transmitting coil group comprises a first transmitting coil and a second transmitting coil, the receiving coil group comprises a first receiving coil and a second receiving coil;

where the first transmitting coil, the second transmitting coil the first receiving coil, and the second receiving coil respectively have a first terminal having a first polarity and a second terminal having a second polarity;

wherein the first terminal of the first transmitting coil is coupled to the second terminal of the first receiving coil, and the second terminal of the second transmitting coil is coupled to the first terminal of the second receiving coil;

wherein a first terminal of the first matching resistor is coupled to the second terminal of the first transmitting coil, and a second terminal of the first matching resistor is coupled to the second terminal of the second transmitting coil; and wherein a first terminal of the second matching resistor is coupled to the first terminal of the second transmitting coil, and a second terminal of the second matching resistor is coupled to the first terminal of the first transmitting coil.

3. The parallel hybrid circuit of claim 2, wherein the echo cancelling circuit comprises:

a first resistance device, having a first terminal coupled to the second terminal of the first matching resistor;

a second resistance device, having a first terminal coupled to the first terminal of the first receiving coil, and having a second terminal coupled to a second terminal of the first resistance device;

a third resistance device, having a first terminal coupled to the second terminal of the second matching resistor;

a fourth resistance device, having a first terminal coupled to the second terminal of the second receiving coil, and having a second terminal coupled to a second terminal of the third resistance device.

4. The parallel hybrid circuit of claim 1, wherein the transmitting coil group comprises a first transmitting coil and a second transmitting coil, the receiving coil group comprises a first receiving coil and a second receiving coil;

where the first transmitting coil, the second transmitting coil the first receiving coil, and the second receiving coil respectively have a first terminal having a first polarity and a second terminal having a second polarity;

wherein the first terminal of the first transmitting coil is coupled to the first terminal of the first receiving coil, and the second terminal of the second transmitting coil is coupled to the second terminal of the second receiving coil;

where a first terminal of the first matching resistor is coupled to the second terminal of the first transmitting coil, and a second terminal of the first matching resistor is coupled to the second terminal of the second transmitting coil; and wherein a first terminal of the second matching resistor is coupled to the first terminal of the second transmitting coil, and a second terminal of the second matching resistor is coupled to the first terminal of the first transmitting coil.

5. The parallel hybrid circuit of claim 4, wherein the echo cancelling circuit comprises:

a first resistance device, having a first terminal coupled to the second terminal of the second matching resistor;

a second resistance device, having a first terminal coupled to the second terminal of the first receiving coil, and having a second terminal coupled to a second terminal of the first resistance device;

a third resistance device, having a first terminal coupled to the second terminal of the first matching resistor;

a fourth resistance device, having a first terminal coupled to the first terminal of the second receiving coil, and having a second terminal coupled to a second terminal of the third resistance device.

6. The parallel hybrid circuit of claim 1, wherein the transmitting coil group comprises a first transmitting coil and a second transmitting coil, the receiving coil group comprises a first receiving coil and a second receiving coil;

where the first transmitting coil, the second transmitting coil the first receiving coil, and the second receiving coil respectively have a first terminal having a first polarity and a second terminal having a second polarity;

wherein the first terminal of the first receiving coil is coupled to the second terminal of the first transmitting coil, and the second terminal of the second receiving coil is coupled to the first terminal of the second transmitting coil;

where a first terminal of the first matching resistor is coupled to the second terminal of the first transmitting coil, and a second terminal of the first matching resistor is coupled to the second terminal of the second transmitting coil; and wherein a first terminal of the second matching resistor is coupled to the first terminal of the second transmitting coil, and a second terminal of the second matching resistor is coupled to the first terminal of the first transmitting coil.

7. The parallel hybrid circuit of claim 6, wherein the echo cancelling circuit comprises:

a first resistance device, having a first terminal coupled to the second terminal of the first receiving coil;

a second resistance device, having a first terminal coupled to the second terminal of the second matching resistor, and having a second terminal coupled to a second terminal of the first resistance device;

a third resistance device, having a first terminal coupled to the first terminal of the second receiving coil;

a fourth resistance device, having a first terminal coupled to the second terminal of the first matching resistor, and having a second terminal coupled to a second terminal of the third resistance device.

8. The parallel hybrid circuit of claim 1, wherein the first turn ratio equals to $cn_t$:$cn_{tr}$ and the second turn ratio equals to $cn_{tr}$:$cn_r$.

9. The parallel hybrid circuit of claim 1, wherein the first turn ratio equals to $cn_t$:$cn_{tr}$ and the second turn ratio equals to $cn_{tr}$:$cn_t$+$cn_r$.

10. The parallel hybrid circuit of claim 1, wherein an echo turn ratio of the parallel hybrid circuit is $cn_t$:$cn_r$.

11. The parallel hybrid circuit of claim 1, wherein an echo turn ratio of the parallel hybrid circuit is $cn_t$:$cn_r$−1.

12. The parallel hybrid circuit of claim 1, wherein an echo turn ratio of the parallel hybrid circuit is $cn_t$:$cn_t$.

13. A parallel hybrid circuit, comprising:
 a transformer, comprising:
  a first side, comprising a transmitting coil group and a receiving coil group, wherein the transmitting coil group comprises at least one transmitting coil respectively having a transmitting coil number $cn_t$, wherein the receiving coil group comprises at least one receiving coil respectively having a receiving coil number $cn_r$;
  a second side comprising at least one transceiving coil having a transceiving coil number $cn_{tr}$;
  wherein the transformer receives a transmitting signal from at least one transmitting line and couples the transmitting signal from the first side to the second side via a first turn ratio to generate a transformed transmitting signal to at least one transceiving line, and receives a receiving signal from the transceiving line and couples the receiving signal from the second side to the first side via a second turn ratio to generate a transformed receiving signal to at least one receiving line;
  where the first turn ratio is relative to the $cn_t$ and the $cn_{tr}$, and the second turn ratio is relative to the $cn_{tr}$ and the $cn_r$;
 a first matching resistor, coupled with the transformer in parallel;
 a second matching resistor, coupled with the transformer in parallel; and
 an echo cancelling circuit coupled between the transmitting line and the receiving line;
 wherein the transmitting coil group comprises a first transmitting coil and a second transmitting coil, the receiving coil group comprises a first receiving coil and a second receiving coil;
 where the first transmitting coil, the second transmitting coil the first receiving coil, and the second receiving coil respectively have a first terminal having a first polarity and a second terminal having a second polarity;
 wherein the first terminal of the first transmitting coil is coupled to the second terminal of the first receiving coil, and the second terminal of the second transmitting coil is coupled to the first terminal of the second receiving coil;
 wherein a first terminal of the first matching resistor is coupled to the second terminal of the first transmitting coil, and a second terminal of the first matching resistor is coupled to the second terminal of the second transmitting coil; and
 wherein a first terminal of the second matching resistor is coupled to the first terminal of the second transmitting coil, and a second terminal of the second matching resistor is coupled to the first terminal of the first transmitting coil.

14. The parallel hybrid circuit of claim 13, wherein the echo cancelling circuit comprises:
 a first resistance device, having a first terminal coupled to the second terminal of the first matching resistor;
 a second resistance device, having a first terminal coupled to the first terminal of the first receiving coil, and having a second terminal coupled to a second terminal of the first resistance device;
 a third resistance device, having a first terminal coupled to the second terminal of the second matching resistor;
 a fourth resistance device, having a first terminal coupled to the second terminal of the second receiving coil, and having a second terminal coupled to a second terminal of the third resistance device.

15. A parallel hybrid circuit, comprising:
 a transformer, comprising:
  a first side, comprising a transmitting coil group and a receiving coil group, wherein the transmitting coil group comprises at least one transmitting coil respectively having a transmitting coil number $cn_t$, wherein the receiving coil group comprises at least one receiving coil respectively having a receiving coil number $cn_r$;
  a second side comprising at least one transceiving coil having a transceiving coil number $cn_{tr}$;
  wherein the transformer receives a transmitting signal from at least one transmitting line and couples the transmitting signal from the first side to the second side via a first turn ratio to generate a transformed transmitting signal to at least one transceiving line, and receives a receiving signal from the transceiving line and couples the receiving signal from the second side to the first side via a second turn ratio to generate a transformed receiving signal to at least one receiving line;
  where the first turn ratio is relative to the $cn_t$ and the $cn_{tr}$, and the second turn ratio is relative to the $cn_{tr}$ and the $cn_r$;
 a first matching resistor, coupled with the transformer in parallel;
 a second matching resistor, coupled with the transformer in parallel; and
 an echo cancelling circuit coupled between the transmitting line and the receiving line;
 wherein the transmitting coil group comprises a first transmitting coil and a second transmitting coil, the receiving coil group comprises a first receiving coil and a second receiving coil;
 where the first transmitting coil, the second transmitting coil the first receiving coil, and the second receiving coil respectively have a first terminal having a first polarity and a second terminal having a second polarity;
 wherein the first terminal of the first transmitting coil is coupled to the first terminal of the first receiving coil, and the second terminal of the second transmitting coil is coupled to the second terminal of the second receiving coil;
 where a first terminal of the first matching resistor is coupled to the second terminal of the first transmitting coil, and a second terminal of the first matching resistor is coupled to the second terminal of the second transmitting coil; and wherein a first terminal of the second matching resistor is coupled to the first terminal of the second transmitting coil, and a second terminal of the second matching resistor is coupled to the first terminal of the first transmitting coil.

16. The parallel hybrid circuit of claim 15, wherein the echo cancelling circuit comprises:
    a first resistance device, having a first terminal coupled to the second terminal of the second matching resistor;
    a second resistance device, having a first terminal coupled to the second terminal of the first receiving coil, and having a second terminal coupled to a second terminal of the first resistance device;
    a third resistance device, having a first terminal coupled to the second terminal of the first matching resistor;
    a fourth resistance device, having a first terminal coupled to the first terminal of the second receiving coil, and having a second terminal coupled to a second terminal of the third resistance device.

17. A parallel hybrid circuit, comprising:
    a transformer, comprising:
        a first side, comprising a transmitting coil group and a receiving coil group, wherein the transmitting coil group comprises at least one transmitting coil respectively having a transmitting coil number $cn_t$, wherein the receiving coil group comprises at least one receiving coil respectively having a receiving coil number $cn_r$;
        a second side comprising at least one transceiving coil having a transceiving coil number $cn_{tr}$;
        wherein the transformer receives a transmitting signal from at least one transmitting line and couples the transmitting signal from the first side to the second side via a first turn ratio to generate a transformed transmitting signal to at least one transceiving line, and receives a receiving signal from the transceiving line and couples the receiving signal from the second side to the first side via a second turn ratio to generate a transformed receiving signal to at least one receiving line;
        where the first turn ratio is relative to the $cn_t$ and the $cn_{tr}$, and the second turn ratio is relative to the $cn_{tr}$ and the $cn_r$;
    a first matching resistor, coupled with the transformer in parallel;
    a second matching resistor, coupled with the transformer in parallel; and
    an echo cancelling circuit coupled between the transmitting line and the receiving line;
    wherein the transmitting coil group comprises a first transmitting coil and a second transmitting coil, the receiving coil group comprises a first receiving coil and a second receiving coil;
    where the first transmitting coil, the second transmitting coil the first receiving coil, and the second receiving coil respectively have a first terminal having a first polarity and a second terminal having a second polarity;
    wherein the first terminal of the first receiving coil is coupled to the second terminal of the first transmitting coil, and the second terminal of the second receiving coil is coupled to the first terminal of the second transmitting coil;
    where a first terminal of the first matching resistor is coupled to the second terminal of the first transmitting coil, and a second terminal of the first matching resistor is coupled to the second terminal of the second transmitting coil; and wherein a first terminal of the second matching resistor is coupled to the first terminal of the second transmitting coil, and a second terminal of the second matching resistor is coupled to the first terminal of the first transmitting coil.

18. The parallel hybrid circuit of claim 17, wherein the echo cancelling circuit comprises:
    a first resistance device, having a first terminal coupled to the second terminal of the first receiving coil;
    a second resistance device, having a first terminal coupled to the second terminal of the second matching resistor, and having a second terminal coupled to a second terminal of the first resistance device;
    a third resistance device, having a first terminal coupled to the first terminal of the second receiving coil;
    a fourth resistance device, having a first terminal coupled to the second terminal of the first matching resistor, and having a second terminal coupled to a second terminal of the third resistance device.

19. A parallel hybrid circuit, comprising:
    a transformer, comprising:
        a first side, comprising a transmitting coil group and a receiving coil group, wherein the transmitting coil group comprises at least one transmitting coil respectively having a transmitting coil number $cn_t$, wherein the receiving coil group comprises at least one receiving coil respectively having a receiving coil number $cn_r$;
        a second side comprising at least one transceiving coil having a transceiving coil number $cn_{tr}$;
        wherein the transformer receives a transmitting signal from at least one transmitting line and couples the transmitting signal from the first side to the second side via a first turn ratio to generate a transformed transmitting signal to at least one transceiving line, and receives a receiving signal from the transceiving line and couples the receiving signal from the second side to the first side via a second turn ratio to generate a transformed receiving signal to at least one receiving line;
        where the first turn ratio is relative to the $cn_t$ and the $cn_{tr}$, and the second turn ratio is relative to the $cn_{tr}$ and the $cn_r$;
    a first matching resistor, coupled with the transformer in parallel;
    a second matching resistor, coupled with the transformer in parallel; and
    an echo cancelling circuit coupled between the transmitting line and the receiving line;
    wherein the first turn ratio equals to $cn_t:cn_{tr}$ and the second turn ratio equals to $cn_{tr}:cn_t+cn_r$.

20. A parallel hybrid circuit, comprising:
    a transformer, comprising:
        a first side, comprising a transmitting coil group and a receiving coil group, wherein the transmitting coil group comprises at least one transmitting coil respectively having a transmitting coil number $cn_t$, wherein the receiving coil group comprises at least one receiving coil respectively having a receiving coil number $cn_r$;
        a second side comprising at least one transceiving coil having a transceiving coil number $cn_{tr}$;
        wherein the transformer receives a transmitting signal from at least one transmitting line and couples the transmitting signal from the first side to the second side via a first turn ratio to generate a transformed transmitting signal to at least one transceiving line, and receives a receiving signal from the transceiving line and couples the receiving signal from the second side to the first side via a second turn ratio to generate a transformed receiving signal to at least one receiving line;

where the first turn ratio is relative to the $cn_t$ and the $cn_{tr}$, and the second turn ratio is relative to the $cn_r$ and the $cn_r$;

a first matching resistor, coupled with the transformer in parallel;

a second matching resistor, coupled with the transformer in parallel; and an echo cancelling circuit coupled between the transmitting line and the receiving line;

wherein an echo turn ratio of the parallel hybrid circuit is $cn_t$:$cn_r$−1.

* * * * *